United States Patent
Ross et al.

(10) Patent No.: US 12,417,360 B2
(45) Date of Patent: Sep. 16, 2025

(54) DETERMINING AND DISPLAYING CORRESPONDENCES BETWEEN SOURCE DATA AND TARGET DATA FROM A TRANSLATION PROCESS

(71) Applicant: International Business Machines Corporation, Armonk, NY (US)

(72) Inventors: Steven I. Ross, S. Hamilton, MA (US); Fernando Carlos Martinez, La Plata (AR); Stephanie Houde, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 18/161,930

(22) Filed: Jan. 31, 2023

(65) Prior Publication Data

US 2024/0256795 A1  Aug. 1, 2024

(51) Int. Cl.
*G06F 40/51* (2020.01)
*G06F 40/284* (2020.01)
*G06F 40/58* (2020.01)

(52) U.S. Cl.
CPC ............ *G06F 40/51* (2020.01); *G06F 40/284* (2020.01); *G06F 40/58* (2020.01)

(58) Field of Classification Search
CPC ......... G06F 40/51; G06F 40/284; G06F 40/58
See application file for complete search history.

(56) References Cited

U.S. PATENT DOCUMENTS 6,006,221 A  12/1999  Liddy et al.
7,366,654 B2  4/2008  Moore
(Continued)

FOREIGN PATENT DOCUMENTS

JP  6474873 B1  4/2019

OTHER PUBLICATIONS

Adi et al. "Analysis of Sentence Embedding Models Using Prediction Tasks in Natural Language Processing", IBM Journal of Research and Development, vol. 61, No. 4/5, 2017, 9 pages.
(Continued)

*Primary Examiner* — Bhavesh M Mehta
*Assistant Examiner* — Jangwoen Lee
(74) *Attorney, Agent, or Firm* — Cantor Colburn LLP; Robert D. Bean (57) ABSTRACT

Computer-implemented methods for determining and displaying correspondence between source data and target data. Aspects include receiving source tokens associated with source data and target tokens associated with target data, generating source encodings for each source token of the set of source tokens, and generating target encodings for each target token of the set of target tokens. Aspects include receiving an indication of a selected source token associated with the source data. Aspects further include determining an identified target token from the set of target tokens corresponding to the selected source token by calculating distances between the selected source token and each of the target tokens in the high-dimensional latent space using the source encodings and the target encodings. Aspects include displaying a correspondence between a portion of the source data corresponding to the selected source token and a portion of the target data associated with the identified target token.

15 Claims, 4 Drawing Sheets

(56) References Cited

U.S. PATENT DOCUMENTS

| | | | |
|---|---|---|---|
| 10,558,762 B2 | 2/2020 | Xu et al. | |
| 10,902,218 B2 | 1/2021 | Xu et al. | |
| 10,922,486 B2 | 2/2021 | Srivatsa et al. | |
| 11,693,637 B1* | 7/2023 | Singh | G06F 8/436 |
| | | | 717/139 |
| 2019/0266249 A1 | 8/2019 | Xu et al. | |
| 2019/0278850 A1* | 9/2019 | Atasu | G06F 16/3347 |
| 2020/0073949 A1 | 3/2020 | Xu et al. | |
| 2020/0293614 A1 | 9/2020 | Srivatsa et al. | |
| 2021/0097144 A1* | 4/2021 | Bapna | G06F 18/22 |
| 2021/0240453 A1* | 8/2021 | Badlani | G06F 8/42 |
| 2021/0390269 A1* | 12/2021 | Rezagholizadeh | G06N 3/08 |
| 2023/0042051 A1* | 2/2023 | Clement | G06N 3/091 |

OTHER PUBLICATIONS

Alphacode Attention Visualization, https://alphacode.deepmind.com/, (Retrieved: Dec. 9, 2022), 3 pages.

Malte et al., "Evolution of Transfer Learning in Natural Language Processing," arXiv preprint, 2019, 11 pages.

Roziere, et al., "Unsupervised Translation of Programming Languages", NeurIPS, 2020, 11 pages.

Vaswani, et al., "Attention is All You Need", arXiv preprint, 2017, 15 pages.

Wang et al., "Application of Convolutional Neural Network in Natural Language Processing", International Conference on Information Systems and Computer Aided Education (ICISCAE), IEEE, 2018, 7 pages.

Weisz, et al, "Better Together? An Evaluation of AI-Supported Code Translation", Demo Video, https://www.youtube.com/watch?v=8bi_LquqfSI, (Retrieved: Mar. 27, 2022), 60 pages.

Whalen et al. "Patent Similarity Data and Innovation Metrics", Journal of Empirical Legal Studies, vol. 17, Issue 3, 2020, pp. 615-639.

Zong et al., "On Application of Natural Language Processing in Machine Translation." 2018 3rd International Conference on Mechanical, Control and Computer Engineering (ICMCCE), IEEE, 2018, 5 pages.

* cited by examiner

DETERMINING AND DISPLAYING CORRESPONDENCES BETWEEN SOURCE DATA AND TARGET DATA FROM A TRANSLATION PROCESS

BACKGROUND

The present invention generally relates to processing data, and more specifically, to computer systems, computer-implemented methods, and computer program products to determine and display correspondences between source data and target data generated through a translation process.

Deep learning and autoregressive techniques are capable of translating programs between programming languages. These translations are often not perfect and require inspection by human programmers. The differences in program syntax and terminology between languages can make it difficult to establish how a translated program corresponds to the original version.

SUMMARY

Embodiments of the present invention are directed to a computer-implemented method of determining and displaying correspondences between source data and target data generated through a translation process. According to an aspect, a computer-implemented method includes receiving a set of source tokens associated with source data and a set of target tokens associated with target data. The method also includes generating source encodings for each source token of the set of source tokens, wherein each source encoding is indicative of a respective location for each source token in a high-dimensional latent space. The method further includes generating target encodings for each target token of the set of target tokens, wherein each target encoding is indicative of a respective location for each target token in the high-dimensional latent space. The method also includes receiving an indication of a selected source token associated with the source data. The method further includes determining an identified target token from the set of target tokens corresponding to the selected source token by calculating distances between the selected source token and each of the target tokens in the high-dimensional latent space using the source encodings and the target encodings. The method includes displaying a correspondence between a portion of the source data corresponding to the selected source token and a portion of the target data associated with the identified target token.

In one embodiment of the present invention, determining the identified target token also includes determining the identified target token by selecting a target token associated with a shortest distance from the distances calculated between the selected source token and each of the target tokens of the set of target tokens in the high-dimensional latent space.

In one embodiment of the present invention, determining the identified target token from the set of target tokens further includes calculating the distances between the selected source token and each of the set of target tokens in the high-dimensional latent space using a Euclidean distance function.

In one embodiment of the present invention, determining the identified target token from the set of target tokens further includes calculating the distances between the selected source token and each of the set of target tokens in the high-dimensional latent space using a Cosine similarity function.

In one embodiment of the present invention, the method also includes determining a set of identified target tokens from the set of target tokens based on a threshold and the distances calculated between the selected source token and each of the set of target tokens in the high-dimensional latent space and displaying a correspondence between the portion of the source data corresponding to the selected source token and portions of the target data associated with the set of identified target tokens.

In one embodiment of the present invention, the method also includes generating a matrix of distances between each source token associated with the source with each target token associated with the target data. The method also includes determining the identified target token based on the matrix of distances.

In one embodiment of the present invention, the method further includes receiving an indication of a selected target token associated with the target data. The method also includes determining an identified source token from the set of source tokens corresponding to the selected target token by calculating distances between the selected target token and each of the set of source tokens in the high-dimensional latent space using the source encodings and the target encodings. The method includes displaying a correspondence between a portion of the source data corresponding to the selected target token and a portion of the target data associated with the identified source token.

According to another non-limiting embodiment of the invention, a system having a memory having computer readable instructions and one or more processors for executing the computer readable instructions, the computer readable instructions controlling the one or more processors to perform operations. The operations include receiving a set of source tokens associated with source data and a set of target tokens associated with target data. The operations also include generating source encodings for each source token of the set of source tokens, wherein each source encoding is indicative of a respective location for each source token in a high-dimensional latent space. The operations further include generating target encodings for each target token of the set of target tokens, wherein each target encoding is indicative of a respective location for each target token in the high-dimensional latent space. The operations also include receiving an indication of a selected source token associated with the source data. The operations further include determining an identified target token from the set of target tokens corresponding to the selected source token by calculating distances between the selected source token and each of the target tokens in the high-dimensional latent space using the source encodings and the target encodings. The operations include displaying a correspondence between a portion of the source data corresponding to the selected source token and a portion of the target data associated with the identified target token.

According to another non-limiting embodiment of the invention, a computer program product for determining and displaying correspondences between source data and target data is provided. The computer program product includes a computer-readable storage medium having program instructions embodied therewith, the program instructions executable by a processor to cause the processor to perform operations. The operations include receiving a set of source tokens associated with source data and a set of target tokens associated with target data. The operations also include generating source encodings for each source token of the set of source tokens, wherein each source encoding is indicative of a respective location for each source token in a high-dimensional latent space. The operations further include generating target encodings for each target token of the set of target tokens, wherein each target encoding is indicative of a respective location for each target token in the high-dimensional latent space. The operations also include receiving an indication of a selected source token associated with the source data. The operations further include determining an identified target token from the set of target tokens corresponding to the selected source token by calculating distances between the selected source token and each of the target tokens in the high-dimensional latent space using the source encodings and the target encodings. The operations include displaying a correspondence between a portion of the source data corresponding to the selected source token and a portion of the target data associated with the identified target token.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Computer programs can be translated from an original programming language to a different programming language. In some instances, this may be to update existing legacy code to a more current programming language or to transition code to a different programming language due to business constraints (e.g., licensing agreements with vendors, efficiencies of a new programming language, etc.). In some instances, users may translate older code to a new programming language to understand a concept that they wish to apply to current solutions.

As discussed above, translations between programming languages are often inaccurate and require inspection by users. Some users may not have the same level of familiarity with both programming languages, which may make inspection of the translation of a program by the user difficult. Translations are often executed through machine learning and correspondences between the original source program and target program (e.g., translation of the source program) may not be easily identifiable. Disclosed herein are methods, systems, and computer program products for determining and displaying correspondences between code programmed in an original programming language (e.g., source data) and its translation into another programming language (e.g., target data). In exemplary embodiments, the code in the original programming language is translated using a transformer-based autoregressive translation model which has an encoder-decoder architecture. The tokens from the source program and the target program are encoded into a machine learning vector representation that represent the tokens in a high-dimensional latent space. The encodings include details of the token and its historical statistical connection to other tokens and its relative position in the program (i.e., source program or target program) and its relationship to other tokens in its respective program.

For example, when a particular token is indicated or selected from the source program, the nearest token of the target program can be identified by computing the distance between the indicated token's encoding in the source program and the encodings of all of the tokens of the target program to find the token of the target program whose encoding is the smallest distance from the encoding of the identified token of the source program. Identification of the correspondences between the source program and the target program can work in either direction—from source program to the target program or from the target program to the source program. For example, a user can select a portion of the source program using a cursor or similar mechanism. The corresponding portion of the target program (i.e., associated with the smallest distance from the identified token of the source program) is visually highlighted so that the user can identify the correspondence between the programs.

In another example embodiment of the invention, a group or set of tokens may be identified in the target program that are closest to the identified token of the source program and may be visually highlighted to the user using an intensity of color highlighting based on the distance of the respective target token from the source token in the high-dimensional latent space.

Although described in terms of translations between programming languages, the example embodiments of the systems and methods described herein are not limited to translations between programming languages. The present disclosure can be applied to translations between natural languages, between a natural language problem statement and a programming language solution implementation, between a textual representations and a 3D representations (e.g., molecules, atoms, etc.), and the like.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
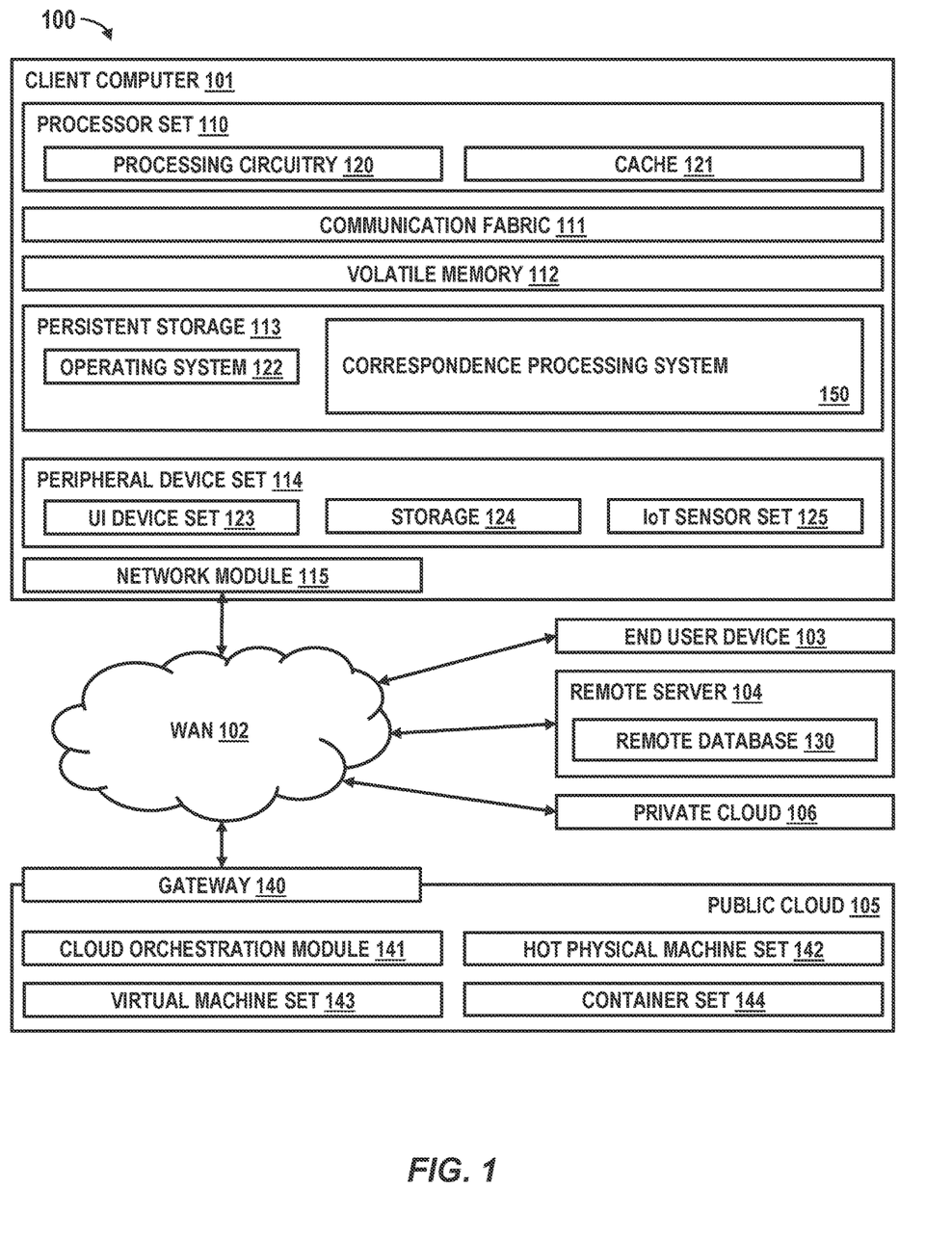
FIG. 1 depicts a block diagram of an example computer system for use in conjunction with one or more embodiments of the present invention.

Computing environment 100 contains an example of an environment for the execution of at least some of the computer code involved in performing the inventive methods, such as determining correspondences between data 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Client computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
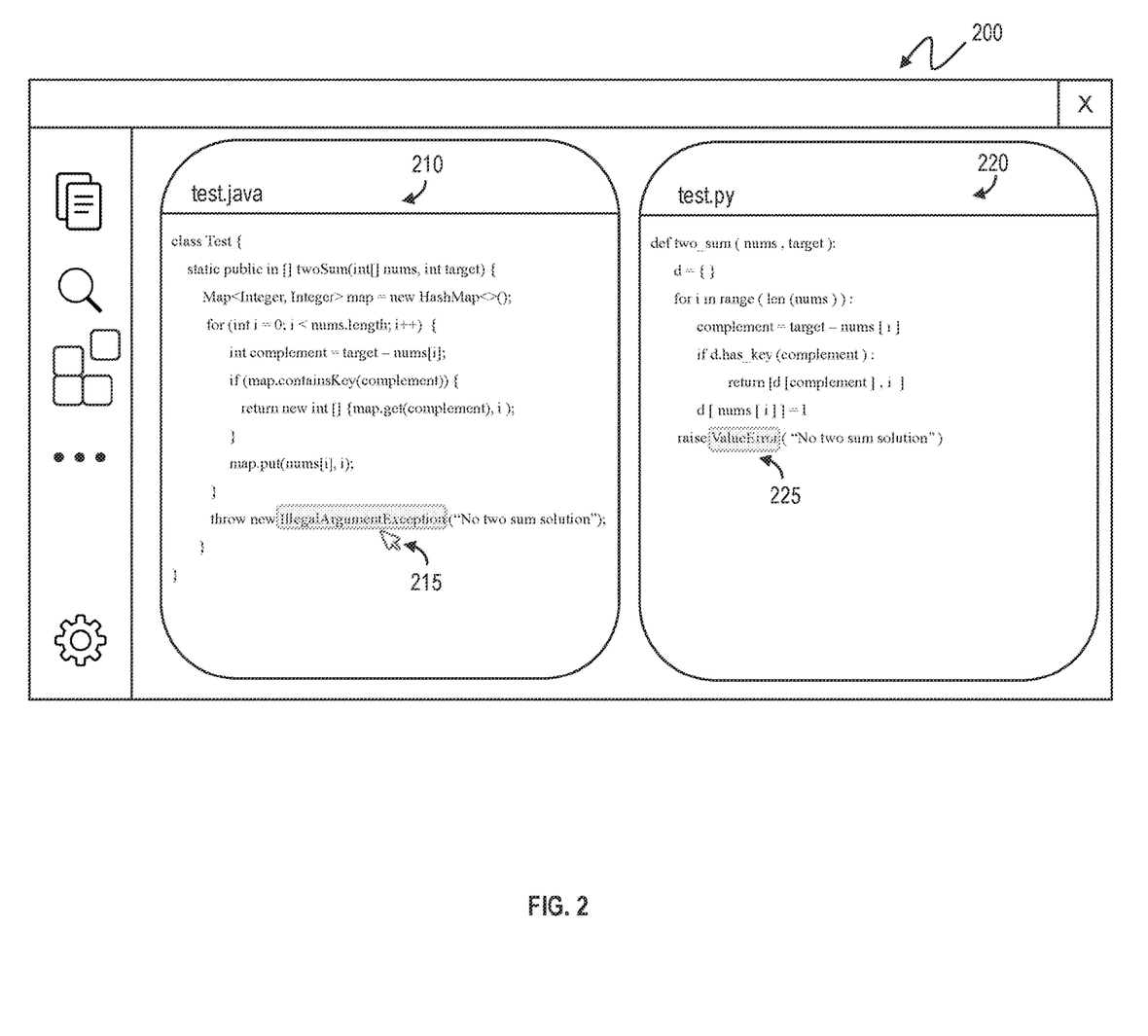
FIG. 2 is a block diagram of an example embodiment of a display of correspondences between source data and target data in accordance with one or more embodiments of the present invention.

Referring now to FIG. 2, an example embodiment 200 for displaying correspondences between source data and target data in accordance with one or more embodiments of the present invention. In one exemplary example, a user can select a source program 210 and request the systems and methods described herein to translate it into a different programming language. The systems and methods described herein can use deep learning and autoregressive techniques to automatically translate and display a target program 220. The target program 220 is a translation of the source program 210 into a different language. In the example depicted, a user chose to translate a source program 210 that is coded in the programming language JAVA into a target program 220 that is coded in the programming language python. The user can use the cursor 215 on a computing device to select or indicate a component of the source program 210. The systems and methods described herein identify a target token corresponding to the selected source token associated with a portion of the source program 210 selected using the cursor 215. The portion of the target program 220 associated with the identified target token corresponding to the indicated source token is visually highlighted 225 to display to the user the correspondence between the source program 210 and the target program 220. Further description of the process and systems for determining and displaying correspondences between programs are described in further detail below.

Figure 3:
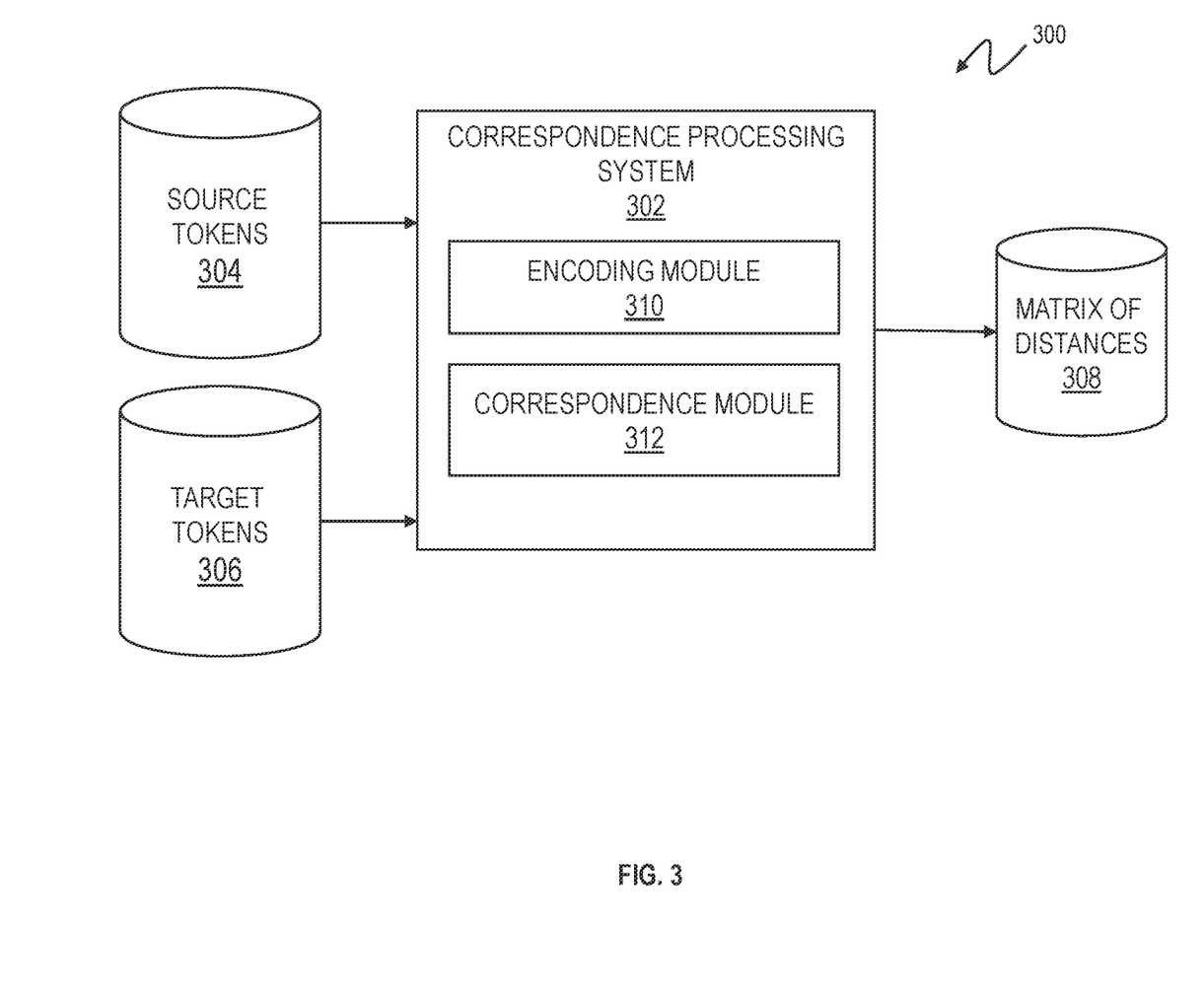
FIG. 3 is a block diagram of a system for determining and displaying correspondences between source data and target data in accordance with one or more embodiments of the present invention.

Referring now to FIG. 3, a system 300 for determining and displaying correspondences between source data and target data in accordance with one or more embodiments of the present invention is shown. In exemplary embodiments, the system 300 includes a correspondence processing system 302 that may be embodied in a computer 101, such as the one shown in FIG. 1. As illustrated, the system 300 includes a correspondence processing system 302 that is configured to receive source tokens 304 associated with a source program and target tokens 306 associated with a target program (i.e., translation of the source program). In exemplary embodiments, the source tokens 304 include tokens associated with a source program in a programming language. The target tokens 306 include tokens associated with a target program which is in a different programming language than the source program and is a translation of the source program.

Programs are translated between programming languages using different techniques, such as deep learning and autoregressive techniques. In some examples, transformer-based autoregressive translations models have an encoder-decoder architecture. During the translation process, programs are processed to generate tokens representing program components (e.g., reserved words, variables, strings, numbers, etc.). The encoding module 310 encodes tokens into a machine learning vector. The encodings of the tokens are numeric vectors that represent different types of data associated with the token. The encoding of the tokens by the encoding module 310 captures the identity of the token, positional encoding (e.g., the position of the token in the program), and its relationship to other tokens in the program. For example, in transformer models, attention functions are applied to the tokens to alter the token embeddings to indicate importance or weight to key tokens in the input sequence of the token. The tokens of the source program are encoded by the encoding module 310 to include data indicating a position of the token in a high-dimensional latent space and its relationship to other tokens in the program. The encodings of the tokens of the source program are then decoded to a different programming language, generating tokens for the target program. The tokens for the target program are re-encoded by the encoding module 310, such as by using a joint language model, to transform the positional data into the same high-dimensional latent space as the tokens of the source program. The encoding of the tokens of the target program by the encoding module 310 can be extracted from the translation process or recomputed independently. In essence, the encoding module 310 encodes the source tokens 304 from the source data and the target tokens 306 from target data to capture the semantics of their respective programs. Corresponding tokens of the source data and the target data will be in close proximity to each other in the high-dimensional latent space represented by the encodings of each token despite their different string representations of the different programming languages.

In exemplary embodiments, the encoding module 310 of the correspondence processing system 302 is configured to use the positional data from the encodings of the source tokens 304 and/or the target tokens 306 of the target program which are indicative of their relative location in a high-dimensional latent space to calculate distances between the tokens. The distances between the tokens in the high-dimensional latent space are indicative of their closeness in correspondence in the translation of the data between the source program and the target program.

In exemplary embodiments, when a user indicates or selects a portion of the source program through a user device, the correspondence module 312 of the correspondence processing system 302 identifies the source token 304 associated with the indicated or selected portion of the source program and uses the encoded representation of that token to calculate or compute the distance in the high-dimensional latent space between the identified source token 304 and all the target tokens 306 associated with the other program (i.e., target program) to find the target token 306 whose encoding has the smallest distance to the identified source token 304. The correspondence module 312 facilitates highlighting or otherwise visually depicting the correspondence between the portion of the source program associated with the identified source token 304 and the portion of the target program associated with the corresponding target token 306.

The identification of correspondences between the source program and the target program (e.g., translation of the source program) can work in either direction. For example, a user can indicate or select a portion of the target program through a user device. The correspondence module 312 can identify the target token 306 associated with the indicated or selected portion of the target program and use its encoding to calculate or compute the distance in the high-dimensional latent space between the identified target token encoding and the encodings of all the tokens of the other program (i.e., source program) to find the source token whose encoding has the smallest distance to the identified target token. The correspondence module 312 facilitates highlighting or otherwise visually depicting the correspondence between the portion of the target program associated with the identified target token and the portion of the source program associated with the corresponding source token.

In exemplary embodiments, the correspondence module 312 of the correspondence processing system 302 is configured to use encodings of the tokens generated by the encoding module 310 to compute distances between the identified source token(s) and the identified target token(s). The correspondence module 312 uses one or more mathematical techniques to compute or otherwise determine the distance between the identified tokens in the high-dimensional latent space using their respective encodings. For example, the correspondence module 312 can use a Euclidean distance function or a Cosine similarity function to calculate or compute the distance between the identified tokens using their respective encodings. In some exemplary embodiments, the correspondence module 312 generates a matrix of distances 308 between all the source tokens 304 associated with the source data and all the target tokens 306 associated with the target data and use the matrix of distances 308 to identify one or more corresponding target tokens 306 in response to an indication of a selected source token 306 and vice versa. In some embodiments, the distances between an identified source token 304 and all the target tokens 306 (or vice versa) are computed on demand. The correspondence module 312 can identify a target token 306 corresponding to the selected source token 304 based on the shortest computed distance in the high-dimensional latent space. In some embodiments, the correspondence module 312 identifies a set of target tokens 306 corresponding to the indicated source token 304 based upon a distance between the selected source token 304 and one or more target tokens 306 that fall within a threshold distance value in the high-dimensional latent space.

In some example embodiments, the correspondence module 306 receives an indication associated with the displayed correspondence between the source data and the target data. The indication can include a confirmation of the accuracy of the displayed correspondence, data indicating a suggested modification for the displayed correspondence, or the like. The indication received from the user can be used in future generation and encoding of tokens associated with source data and/or target data.

Figure 4:
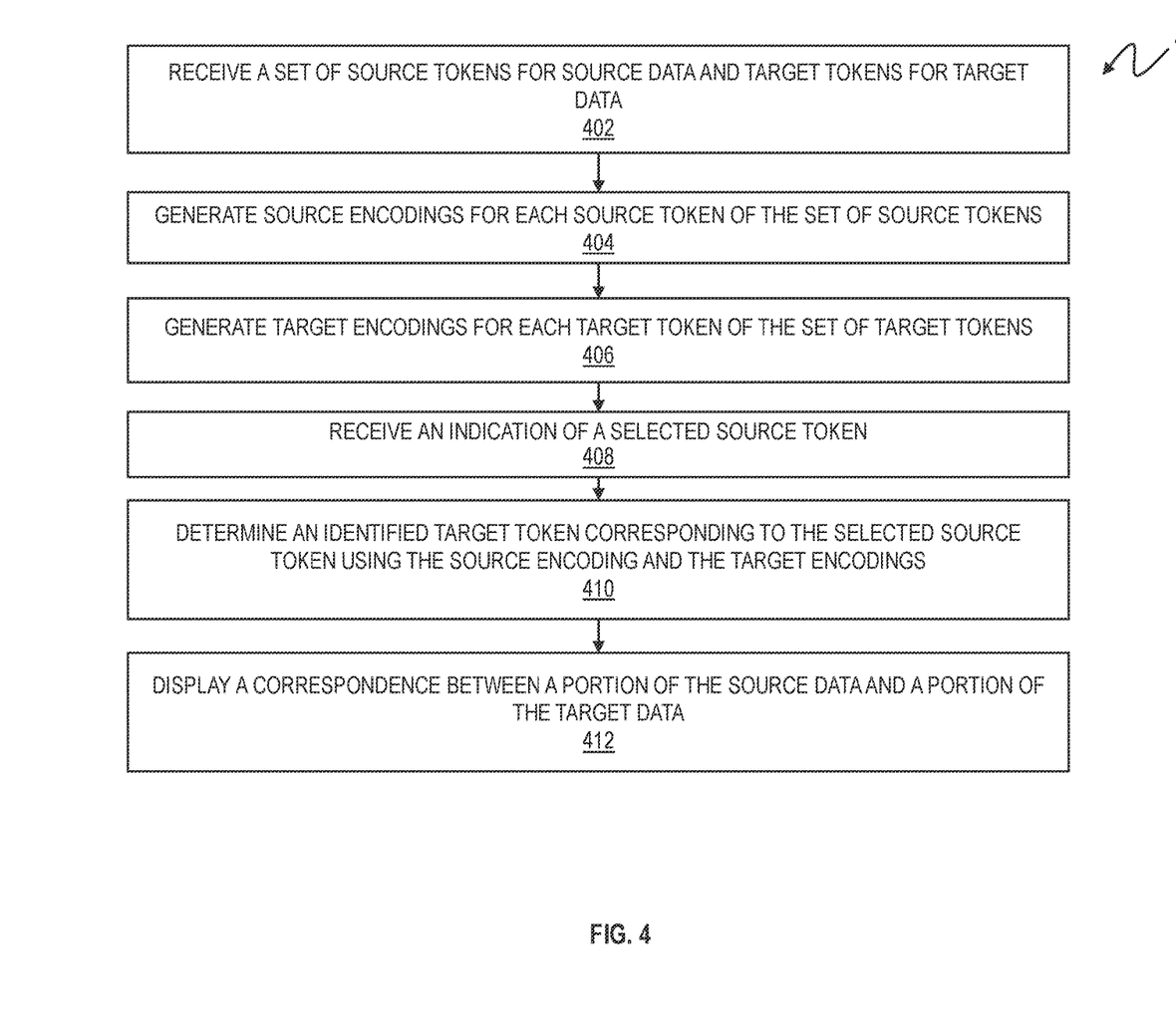
FIG. 4 is a flowchart of a method for determining and displaying correspondences between source data and target data in accordance with one or more embodiments of the present invention.

Referring now to FIG. 4, a flowchart of a method 400 for determining and displaying correspondences between source data and target data in accordance with one or more embodiments of the present invention is shown. Although the method is described in the context of the system 300 finding and displaying correspondences in the target data for a selected portion of the source data, the systems and methods described herein are directed selecting a portion of a program and finding its correspondences in the other program. For example, if a portion of a source program is selected, correspondences in the target program are identified and displayed, whereas if a portion of a target program is selected, correspondences in the source program are displayed. In some embodiments, the system 300 identifies the n-closest target tokens 306 of a target program for a selected source token 304 (or vice versa). In some examples, multiple source tokens 304 are selected and the system identifies and displays all the target tokens 306 that correspond to the selected source tokens 304 (e.g., multiple source token 304 to multiple target token 306 correspondence).

The method 400 begins at block 402 by receiving a set of source token 304 associated with source data (e.g., source program) and a set of target tokens 306 associated with target data (e.g., target program or translation of source program). In some example embodiments, the source data is processed to generate a set of source tokens 304 that represent the program components of the source data. Similarly, the target data is processed to generate a set of target tokens 306 that represent the program components of the target data. Examples of program components include, but are not limited to, reserved words, variables, strings, numbers, and the like in a programming language.

The method 400 further includes the encoding module 310 generating source encodings for each source token of the set of source tokens 304, as shown in block 404. In exemplary embodiments, the encoding module 310 generates source encodings for the source tokens 304. The source encodings are numeric vectors that represent different types of data associated with the respective source token and captures the identity of the source token 304, positional encoding in the source data, and its relationship to other source tokens 304 in the source data. The source encodings are used to calculate or determine a position of the source token 304 in a high-dimensional latent space and its relationship to other source tokens in the source data.

Next, at block 406 of method 400, the encoding module 310 generating target encodings for each target token 306 of the set of target tokens 306. Similar to source encodings generated at block 404, the target encodings are used by the encoding module 310 to calculate or determine a position of the target token 306 in the high-dimensional latent space and its relationship to other target tokens 306 in the target data.

At block 408 of the method 400, an indication of a selected source token 304 is received. In exemplary embodiments, a user can use a cursor 215 to select or identify a portion of a source program 210 associated with a source token 304. Next, as shown at block 410, the method 400 includes the encoding module 310 using the generated source encoding for the selected source token 304 and the generated target encodings of the target tokens 306 to calculated the distance between the selected source token 304 and each of the target tokens 306 in the high-dimensional latent space. In one embodiment, the correspondence module 312 calculates or computes distances between the identified source token 304 of the source data and each of the target tokens 306 associated with the target data. The correspondence module 312 calculates the distances between the source tokens 304 and target tokens 306 using the generated encodings associated with each token and known mathematical techniques to calculate distances in high dimensional spaces, such as Euclidean distance functions or Cosine similarity functions.

In some example embodiments, the correspondence module 312 computes the distances between the identified source token 304 and all of the target tokens 306 on demand and identifies a target token 306 that is the shortest distance in the high-dimensional latent space from the identified source token 304 that thus corresponds to the identified source token 304. In some embodiments, the correspondence module 312 generates a matrix of distances 308 in the high-dimensional latent space between each source token 304 encoding and each target token 306 encoding. The correspondence module 312 uses the matrix of distances 308 to identify one or more target tokens 306 that correspond to the identified source token 304.

The method 400 also includes displaying a correspondence between a portion of the source data and a portion of the target data, as shown at block 412. The correspondence module 312 facilitates displaying the correspondence between a portion of the source data and a portion of the target data. For example, the correspondence module 312 highlights the portion of the source data identified by the user, such as by using a cursor 215 and is associated with the selected source token 304. The correspondence module 312 facilitates the highlighting of the portion of the source data identified by the user by altering the appearance of the portion of the source data, such as by altering the color of the text of the identified portion of the source data or highlighting the portion of the source using a color, outline, or any other known technique for marking a portion of the source data. The correspondence module 312 facilitates displaying the corresponding portion of the target data associated with the identified target token 306 with the shortest distance in the high-dimensional latent space from the identified source token 304. The corresponding portion of the target data is highlighted using the same or similar method of highlighting text used on the identified portion of the source data. In some examples, a set of target tokens 306 corresponding to the identified source token 304 is displayed using intensity of color or highlighting based at least in part on the distance of the relative target token 306 to the identified source token 304 in the high-dimensional latent space. For example, the portion of the target data that corresponds to the target token 306 with the shortest distance from the source token 304 is highlighted using the brightest hue of a designated color. The portion of the target data corresponding to a target token 306 with the next smallest distance from the source token 304 is highlighted using a hue of the designated color that is less bright than the hue associated with the target token 306 with the smallest distance.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a set of source tokens associated with source data and a set of target tokens associated with target data;
generating source encodings for each source token of the set of source tokens, wherein each source encoding is indicative of a respective location for each source token in a high-dimensional latent space;
generating target encodings for each target token of the set of target tokens, wherein each target encoding is indicative of a respective location for each target token in the high-dimensional latent space;
receiving an indication of a selected source token associated with the source data;
determining an identified target token from the set of target tokens corresponding to the selected source token by calculating distances between the selected source token and each of the target tokens in the high-dimensional latent space using the source encodings and the target encodings; and
displaying, via an interactive user interface, a correspondence between a portion of the source data corresponding to the selected source token and a portion of the target data associated with the identified target token, wherein the correspondence is visually highlighted,
receiving an indication of a selected target token associated with the target data;
determining an identified source token from the set of source tokens corresponding to the selected target token by calculating distances between the selected target token and each of the source tokens in the high-dimensional latent space using the source encodings and the target encodings, thereby enabling bidirectional mapping between the source data and the target data;
determining a set of identified target tokens from the set of target tokens based on a threshold and the distances calculated between the selected source token and each of the target tokens in the high-dimensional latent space; and
displaying, via the interactive user interface, a correspondence between the portion of the source data corresponding to the selected source token and portions of the target data associated with the set of identified target tokens, wherein the portions of the target data are visually highlighted with varying intensities based on their respective distances from the selected source token.

2. The computer-implemented method of claim 1, wherein determining the identified target token further comprises:
determining the identified target token by selecting a target token associated with a shortest distance from the distances calculated between the selected source token and each of the target tokens of the set of target tokens in the high-dimensional latent space.

3. The computer-implemented method of claim 1, wherein determining an identified target token from the set of target tokens further comprises:
calculating the distances between the selected source token and each of the set of target tokens in the high-dimensional latent space using a Euclidean distance function.

4. The computer-implemented method of claim 1, wherein determining the identified target token from the set of target tokens further comprises:
calculating the distances between the selected source token and each of the set of target tokens in the high-dimensional latent space using a Cosine similarity function.

5. The computer-implemented method of claim 1, further comprising:
generating a matrix of distances between each source token associated with the source data with each target token associated with the target data; and
determining the identified target token based on the matrix of distances.

6. A system comprising:
a memory having computer readable instructions; and
one or more processors for executing the computer readable instructions, the computer readable instructions controlling the one or more processors to perform operations comprising:
receiving a set of source tokens associated with source data and a set of target tokens associated with target data;
generating source encodings for each source token of the set of source tokens, wherein each source encoding is indicative of a respective location for each source token in a high-dimensional latent space;
generating target encodings for each target token of the set of target tokens, wherein each target encoding is indicative of a respective location for each target token in the high-dimensional latent space;
receiving an indication of a selected source token associated with the source data;
determining an identified target token from the set of target tokens corresponding to the selected source token by calculating distances between the selected source token and each of the target tokens in the high-dimensional latent space using the source encodings and the target encodings; and
displaying, via an interactive user interface, a correspondence between a portion of the source data corresponding to the selected source token and a portion of the target data associated with the identified target token, wherein the correspondence is visually highlighted,
receiving an indication of a selected target token associated with the target data and determining an identified source token from the set of source tokens corresponding to the selected target token by calculating distances between the selected target token and each of the source tokens in the high-dimensional latent space using the source encodings and the target encodings, thereby enabling bidirectional mapping between the source data and the target data;

determining a set of identified target tokens from the set of target tokens based on a threshold and the distances calculated between the selected source token and each of the target tokens in the high-dimensional latent space; and displaying, via the interactive user interface, a correspondence between the portion of the source data corresponding to the selected source token and portions of the target data associated with the set of identified target tokens, wherein the portions of the target data are visually highlighted with varying intensities based on their respective distances from the selected source token.

7. The system of claim 6, wherein the operations determining the identified target token further comprise:

determining the identified target token by selecting a target token associated with a shortest distance from the distances calculated between the selected source token and each of the target tokens of the set of target tokens in the high-dimensional latent space.

8. The system of claim 6, wherein the operations determining the identified target token from the set of target tokens further comprise:

calculating the distances between the selected source token and each of the set of target tokens in the high-dimensional latent space using a Euclidean distance function.

9. The system of claim 6, wherein the operations determining the identified target token from the set of target tokens further comprise:

calculating the distances between the selected source token and each of the set of target tokens in the high-dimensional latent space using a Cosine similarity function.

10. The system of claim 6, wherein the operations further comprise:

generating a matrix of distances between each source token associated with the source data with each target token associated with the target data; and determining the identified target token based on the matrix of distances.

11. A computer program product comprising a non-transitory computer readable storage medium having program instructions embodied therewith, the program instructions executable by a processor to cause the processor to perform operations comprising:

receiving a set of source tokens associated with source data and a set of target tokens associated with target data;

generating source encodings for each source token of the set of source tokens, wherein each source encoding is indicative of a respective location for each source token in a high-dimensional latent space;

generating target encodings for each target token of the set of target tokens, wherein each target encoding is indicative of a respective location for each target token in the high-dimensional latent space;

receiving an indication of a selected source token associated with the source data;

determining an identified target token from the set of target tokens corresponding to the selected source token by calculating distances between the selected source token and each of the target tokens in the high-dimensional latent space using the source encodings and the target encodings; and displaying, via an interactive user interface, a correspondence between a portion of the source data corresponding to the selected source token and a portion of the target data associated with the identified target token, wherein the correspondence is visually highlighted, receiving an indication of a selected target token associated with the target data and determining an identified source token from the set of source tokens corresponding to the selected target token by calculating distances between the selected target token and each of the source tokens in the high-dimensional latent space using the source encodings and the target encodings, thereby enabling bidirectional mapping between the source data and the target data;

determining a set of identified target tokens from the set of target tokens based on a threshold and the distances calculated between the selected source token and each of the target tokens in the high-dimensional latent space; and displaying, via the interactive user interface, a correspondence between the portion of the source data corresponding to the selected source token and portions of the target data associated with the set of identified target tokens, wherein the portions of the target data are visually highlighted with varying intensities based on their respective distances from the selected source token.

12. The computer program product of claim 11, wherein the operations determining the identified target token further comprise:

determining the identified target token by selecting a target token associated with a shortest distance from the distances calculated between the selected source token and each of the target tokens of the set of target tokens in the high-dimensional latent space.

13. The computer program product of claim 11, wherein the operations determining the identified target token from the set of target tokens further comprise:

calculating the distances between the selected source token and each of the set of target tokens in the high-dimensional latent space using a Euclidean distance function.

14. The computer program product of claim 11, wherein the operations determining the identified target token from the set of target tokens further comprise:

calculating the distances between the selected source token and each of the set of target tokens in the high-dimensional latent space using a Cosine similarity function.

15. The computer-implemented method of claim 1, wherein the interactive user interface further comprises providing a side-by-side view of the source data and the target data, with corresponding portions visually linked using lines or connectors.

* * * * *